United States Patent
Fehr et al.

(10) Patent No.: US 6,695,008 B2
(45) Date of Patent: Feb. 24, 2004

(54) LIQUID DISTRIBUTOR FOR COLUMNS

(75) Inventors: Emil Fehr, Berg am Irchel (CH); Adrian Faust, Balterswil (CH); Markus Fischer, Constance (DE)

(73) Assignee: Sulzer Chemtech AG, Winterthur (CH)

(*) Notice: Subject to any disclaimer, the term of this patent is extended or adjusted under 35 U.S.C. 154(b) by 0 days.

(21) Appl. No.: 10/116,565

(22) Filed: Apr. 4, 2002

(65) Prior Publication Data

US 2002/0174900 A1 Nov. 28, 2002

(30) Foreign Application Priority Data

May 23, 2001 (EP) .......................................... 01810510

(51) Int. Cl.$^7$ ................................................. B01F 3/04
(52) U.S. Cl. ............................ 137/561 A; 137/315.01; 137/884; 251/367
(58) Field of Search .................. 251/367; 137/561 A, 137/315.01, 884

(56) References Cited

U.S. PATENT DOCUMENTS 4,254,938 A * 3/1981 Inada et al. ................. 251/367
5,209,259 A * 5/1993 Dear et al. .............. 137/561 A
5,954,091 A * 9/1999 Leadford ..................... 137/587
6,189,566 B1 * 2/2001 Beutler .................... 137/561 A

FOREIGN PATENT DOCUMENTS

| DE | 33 46 857 A1 | 7/1985 |
| EP | 0 501 615 A2 | 9/1992 |

* cited by examiner

Primary Examiner—A. Michael Chambers
(74) Attorney, Agent, or Firm—Townsend and Townsend and Crew LLP

(57) ABSTRACT

The liquid distributor (1) for columns (6) has a main passage (2), a plurality of secondary passages (3) and an outflow system (5) of the main passage. The liquid (4) to be distributed can be fed into the secondary passages in accordance with a pre-set ratio by this outflow system. The outflow system (5) comprises apertures (20) in the side walls of the main passage and—associated with the secondary passages—guide elements (50) for the liquid (41) exiting through the apertures. The guide elements are designed with respect to a liquid guidance such that the liquid (42) can be led into the associated secondary passage.

12 Claims, 4 Drawing Sheets

LIQUID DISTRIBUTOR FOR COLUMNS

BACKGROUND OF THE INVENTION

The invention relates to a liquid distributor for columns and to a column having such a liquid distributor, with the column being provided for a material exchange between a gas flow and a liquid flow flowing on a packing.

It is necessary for a good efficiency of the column that no mal-distribution of the liquid occurs, that is that the liquid trickles in a homogeneously distributed manner over the surfaces inside the packing. For a mal-distribution not to take place, the liquid must be poured onto the packing in an even and sufficiently fine distribution. This is possible by means of a suitably designed liquid distributor by which the liquid is distributed onto the packing via a passage system and using outflow systems.

In a known liquid distributor, which has been given the name "element distributor", the passage system consists of a main passage and a plurality of secondary passages which are arranged beneath the main passage. The liquid to be distributed is fed into the secondary passages in a pre-set ratio by an outflow system of the main passage. This ratio is, as a rule, equal to the ratio between the part areas of the packing surface which are associated with the secondary passages and to which liquid is to be distributed in proportion to the area of the part area. The liquid leaves the distributor through an outflow system of the secondary passages. The outflow system of the secondary passages is present, for example, in the form of a plurality of side openings with drainage pipes or impact plates, or of a plurality of base openings. The outflow system of the main passage of a distributor, which is to be improved, normally consists of hood-like chambers, open to the bottom, which are arranged in the bottom of the main passage above rectangular openings corresponding to the secondary passages, with the lower edges of the chambers being sealingly connected, as a rule welded, to those of the openings. Apertures in the side walls of these chambers allow the liquid exiting the main passage to flow into the associated secondary passages. During this inflow, choppy flow fields result which become disturbingly noticeable in the form of a fluctuating outflow in the outflow system of the secondary passages. Disadvantages are that with respect to the main passage the hood-like chambers restrict the cross-section of the passage which is available for the flow of the liquid to be distributed and that the construction is relatively expensive due to welding work.

SUMMARY OF THE INVENTION

It is an object of the invention to provide a favorably priced liquid distributor of the "element distributor" type in which the liquid flows through the main passage unhindered by an outflow system and is led into the secondary passages such that it enters into the outflow systems of the secondary passages as a calmed flow.

The liquid distributor has a main passage, a plurality of secondary passages and an outflow system of the main passage. The liquid to be distributed can be fed into the secondary passages in accordance with a pre-set ratio by this outflow system. The outflow system comprises apertures in the side walls of the main passage and—associated with the secondary passages—guide elements for the liquid exiting through the apertures. The guide elements are designed with respect to a liquid guidance such that the liquid can be led into the respective associated secondary passage.

The invention is explained below with reference to the drawings.

DESCRIPTION OF THE PREFERRED EMBODIMENTS

Figure 1:
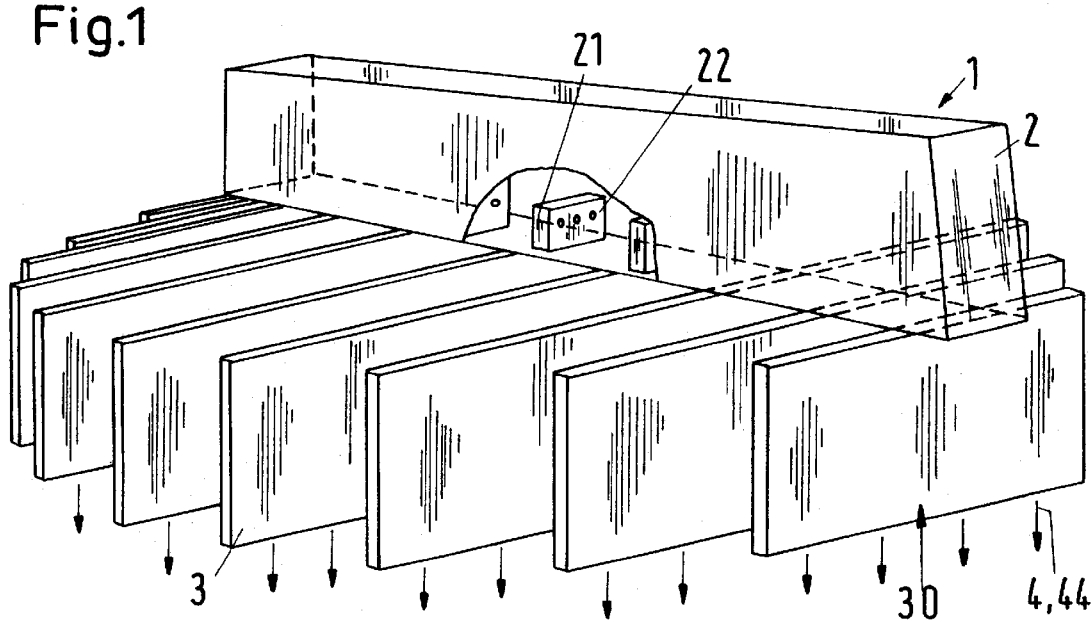
FIG. 1 shows in a simplified illustration, a known liquid distributor having a main passage and secondary passages.

The liquid distributor 1 illustrated in a simplified manner in FIG. 1 is a known "element distributor"; it comprises a main passage 2 and secondary passages 3 which are open to the top. Constructive elements required for a stable setup of the liquid distributor 1 are not shown. An outflow system 30 of the secondary passages 3, through which a liquid 4 is poured onto a packing 7 (see FIG. 3) in a uniform distribution and which one can imagine as consisting of base openings in the distributor 1 shown, is likewise not illustrated.

A wall part, which is broken open, reveals the above-described outflow system of the main passage 2. This consists of hood-like chambers 21 which are arranged at the floor of the main passage 2 above openings. Lower edges of the chambers are sealingly connected to the edges of the openings. Apertures 22 allow the liquid 4 exiting the main passage 2 to flow into the secondary passages 3 associated with the chambers 21.

Figure 2:
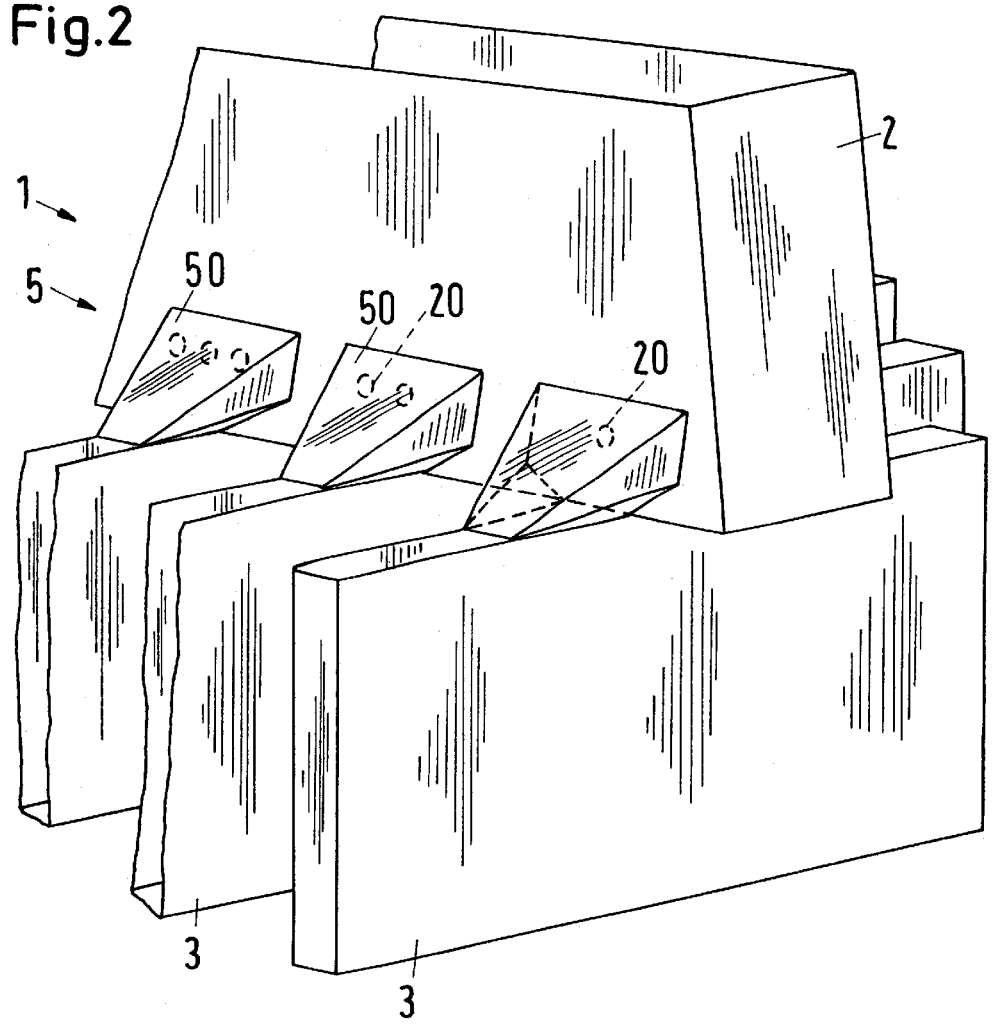
FIG. 2 shows, sectionally illustrated, a liquid distributor of the invention.

With the liquid distributor 1 illustrated sectionally in FIG. 2, an outflow system 5 of the main passage 2 can be recognized with which the liquid to be distributed can be fed into the secondary passages in accordance with a pre-set ratio. It is a liquid distributor 1 in accordance with the invention, in which the outflow system 5 comprises apertures 20 in the side walls of the main passage 2 and— associated with the secondary passages 3—guide elements 50 for the liquid 41 (FIG. 3) exiting through the apertures 20. In contrast to the outflow system shown in FIG. 1, this outflow system 5 no longer forms an obstacle for the liquid 4 flowing in the main passage 2.

The apertures 20 correspond in number and size to the pre-set ratio in accordance with which the liquid 4 is to be distributed into the secondary passages.

The cross-section narrows in the flow direction in each guide element 50 and with this shape brings about the liquid guidance with which the liquid 4 enters into the associated secondary passage 3 in the form of a jet 42 without loss. Essentially only the horizontal speed component of the liquid jet 41 exiting the main passage 2 is influenced by the liquid guidance in the guide element 50. The speed component in the direction of the secondary passage 3 remains largely unaffected. The liquid jet 41 enters the secondary passage 3 with a large horizontal speed component and a small vertical speed component such that a calmed, even flow is formed there. A distribution thus results for the liquid 44 flowing out of the outflow system 30 of the secondary passages 3 which is subject only to slight fluctuations: the liquid distribution is of low fluctuation.

In the distributor 1 of the invention, the apertures 20 can be arranged distributed over the whole longitudinal extent of the main passage. This allows a positioning of the apertures 20 at relatively large intervals so that a mutual influencing of adjacent apertures 20 is smaller than if the apertures 20 were arranged very close to one another.

Figure 3:
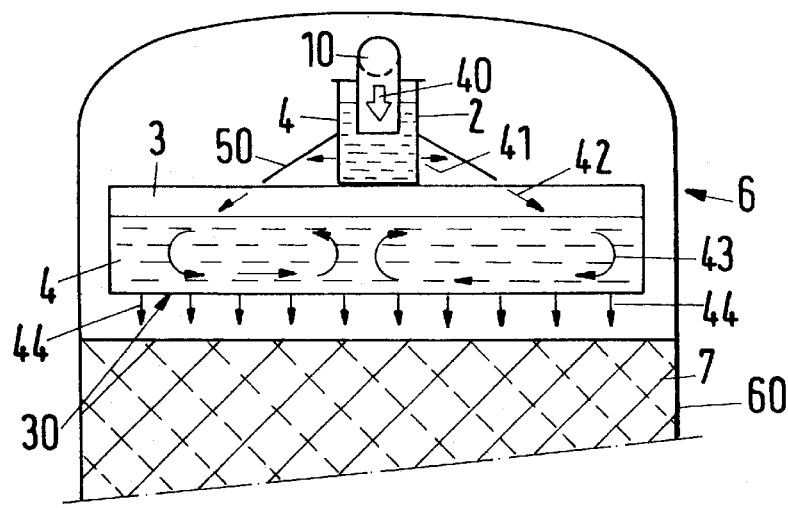
FIG. 3 is a longitudinal section through the upper part of a column.

The longitudinal section through the upper part of a column 6 (with the column wall 60) illustrated in FIG. 3 shows a main passage 2 in cross-section, a secondary passage 3 in longitudinal section and the upper part of an ordered package 7, which is composed, for example, of corrugated material surfaces—forming a cross-passage structure. The liquid 4 to be treated is fed into the main passage 2 (arrow 40) via a pipe 10 and distributed from there via the guide elements 50 into the secondary passages 3. The liquid 4 is there supplied in a largely uniform manner to the outflow system 30 (not shown) via circulating flows 43 which are driven by the liquid jets 42.

Figure 4:
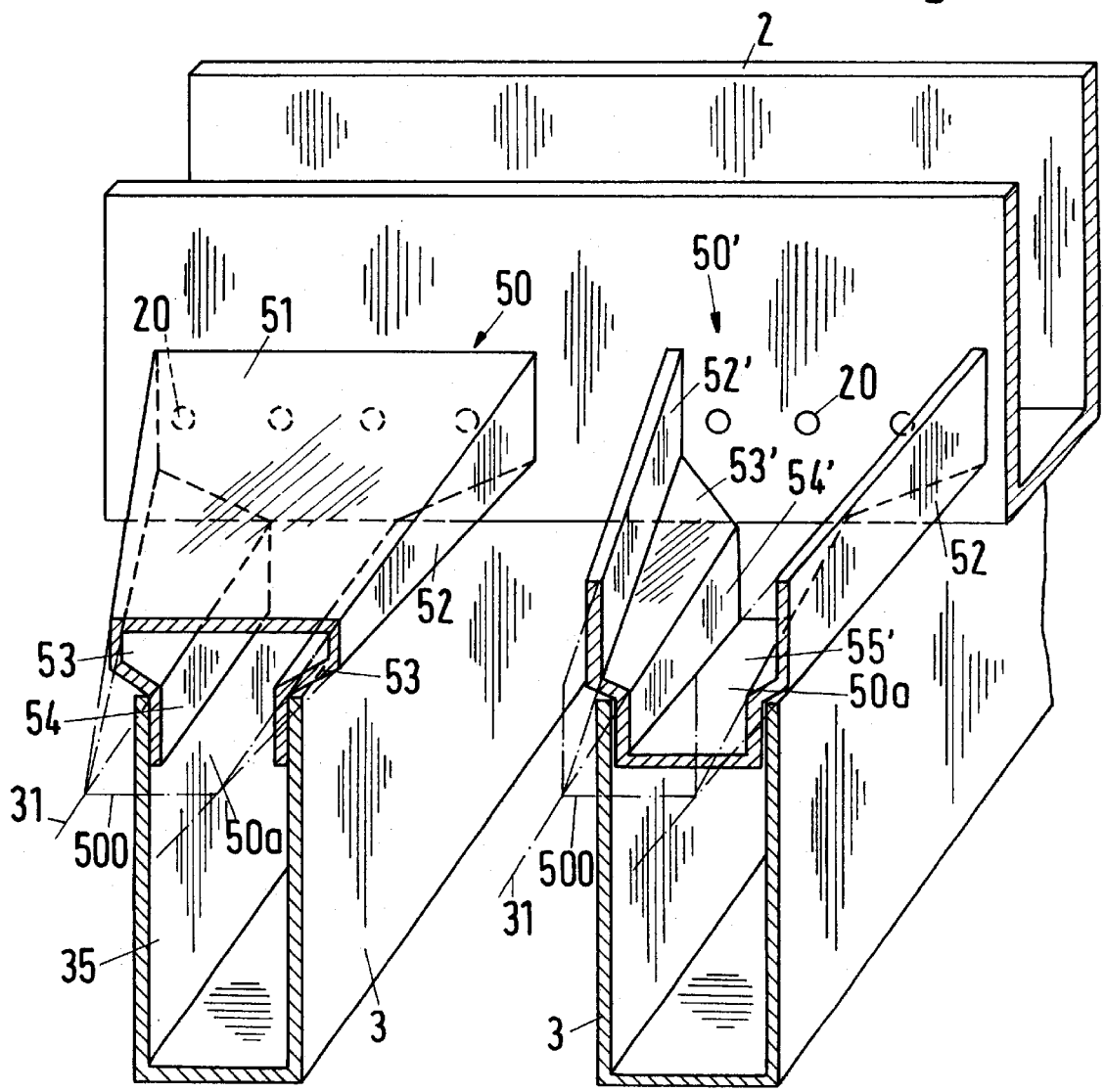
FIGS. 4, 5 show details of three embodiments of the liquid distributor of the invention.
Figure 5:
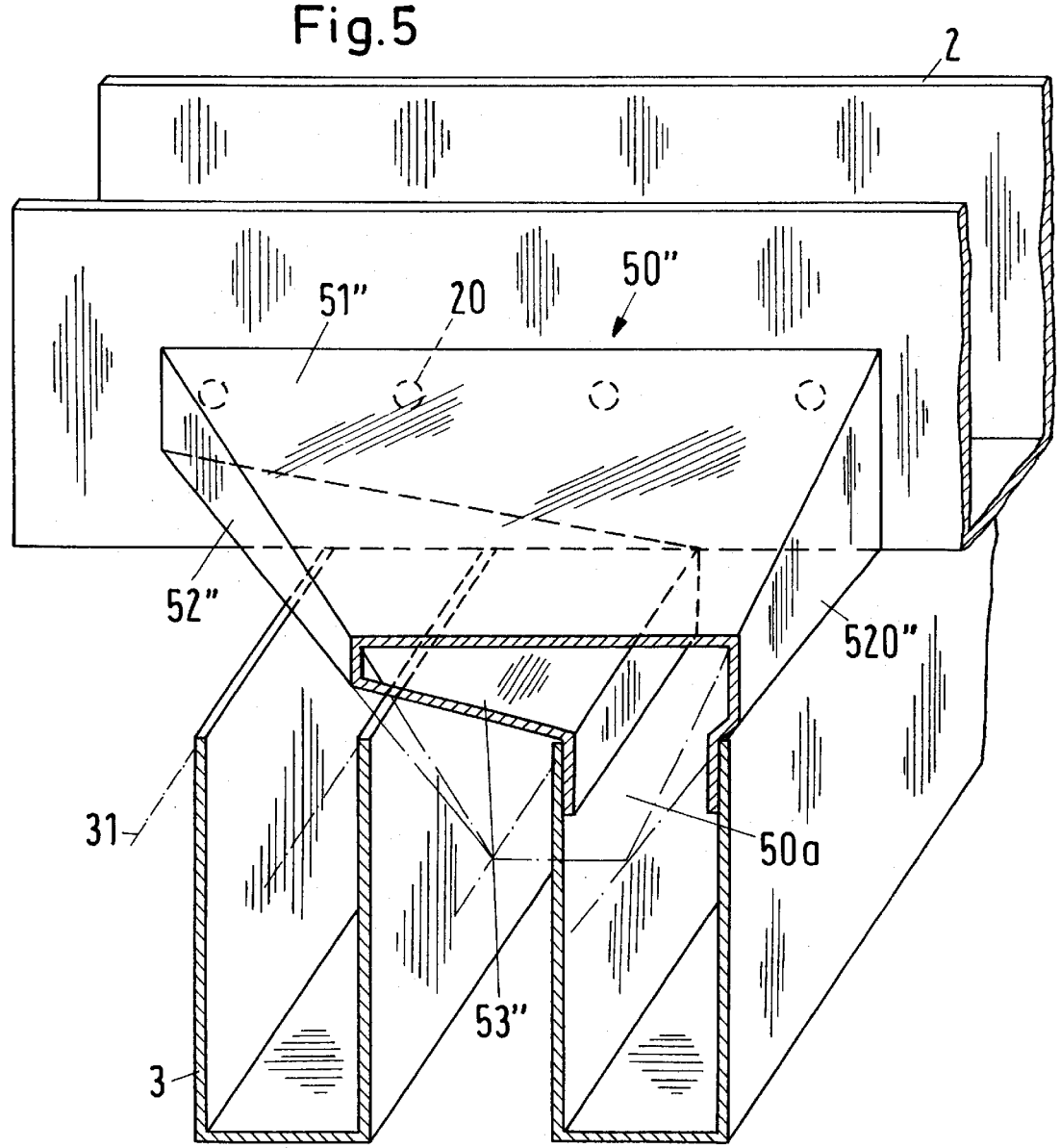

In FIGS. 4 and 5, details of three embodiments of the liquid distributor of the invention are illustrated which differ by differently formed guide elements 50, 50' and 50". As a rule, a uniform type of guide organ—in contrast to FIG. 4—is used. To better illustrate the construction, the front parts 50a of the guide elements 50, 50', 50" are shown in cut-away manner in each case as well as the corresponding parts of the secondary passages 3. The side edges of the cut-away parts 50a and the front edge 500 are indicated in chain-dotted lines. The upper side edges 31 of the secondary passages 3 are likewise indicated in chain-dotted lines.

Figure 6:
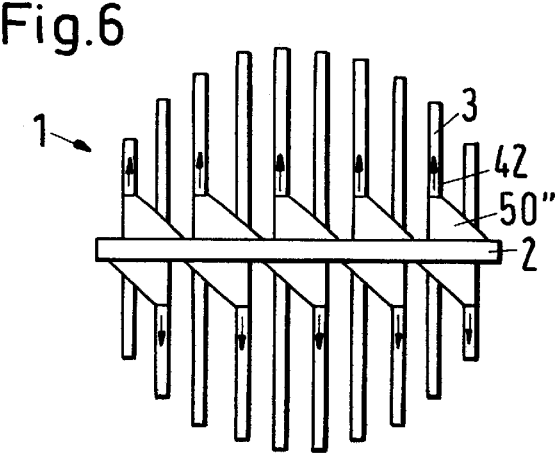
FIG. 6 is a plan view of a liquid distributor which belongs to the type illustrated in FIG. 5.

As a rule, one guide element 50 or 50' each is associated with each secondary passage 3 in a symmetrical manner at the two longitudinal sides of the main passage 2. It is, however, also possible, for example, for only one guide element 50" each—see FIG. 6—to be associated with the secondary passages 3 in an offset arrangement of the guide elements 50".

The first guide element 50 in FIG. 4 corresponds to those shown in FIG. 2. This guide element 50 and the second guide element 50' are each manufactured from a suitably shaped piece of sheet metal by forming. They are formed in a mirror-symmetrical manner with respect to a vertical plane directed in the longitudinal extent of the secondary passage 3.

The guide element 50 is closed to the top: it consists of a slanting roof surface 51, two vertical flanks 52, two triangular part areas 52 and two flanks 54 which are inserted under a pre-stressing between the side areas 35 of the secondary passage 3. The liquid 4, which flows out of the main passage through the apertures 20, is first guided downwardly from the roof surface 51 at a flat angle and led through the wall 52, 53 of the guide element 50 to the front edge 500, where it enters into the secondary passage 3—distributed over its width.

The guide element 50' is open to the top and has the following part areas: vertical side surfaces 52', slanting triangular surfaces 53', vertical wall pieces 54', which project into the secondary passage 3, and a horizontal connection surface 55'. Parabolic liquid jets 41, which exit the apertures 20, impact directly, or guided by the wall 52', 53', onto the connection surface 55', on which the liquid 4 continues to flow into the inner space of the secondary passage 3.

FIG. 5 shows an asymmetrically formed guide element 50" which extends over two adjacent secondary passages 3.

It has the following part areas: an upper side 51", side flanks 52" and 520" and a triangular surface 53". This guide element 50" is suitable for a distributor 1 such as is shown as a plan view in FIG. 6. Symmetrical guide elements 50—two each per secondary passage—can also be provided in a middle region and asymmetrical guide elements 50" in the outer regions.

The outflow system 5 of the secondary passages 3 allows a connection technique to be used in the manufacture of the distributor 1 of the invention in which the guide elements 50 of the outflow system 5 form only form-locked connections to the main passage 2 and to the secondary passages 3. The guide elements 50, 50' and 50" are set onto their associated secondary passages 3, with sealing connections, in particular weld seams, no longer being necessary. This allows a low-cost manufacture. It is also of advantage for the guide elements 50 to be installed at the location of use. They can likewise be dismantled there, which allows a good accessibility for a cleaning of the distributor 1.

Figure 7:
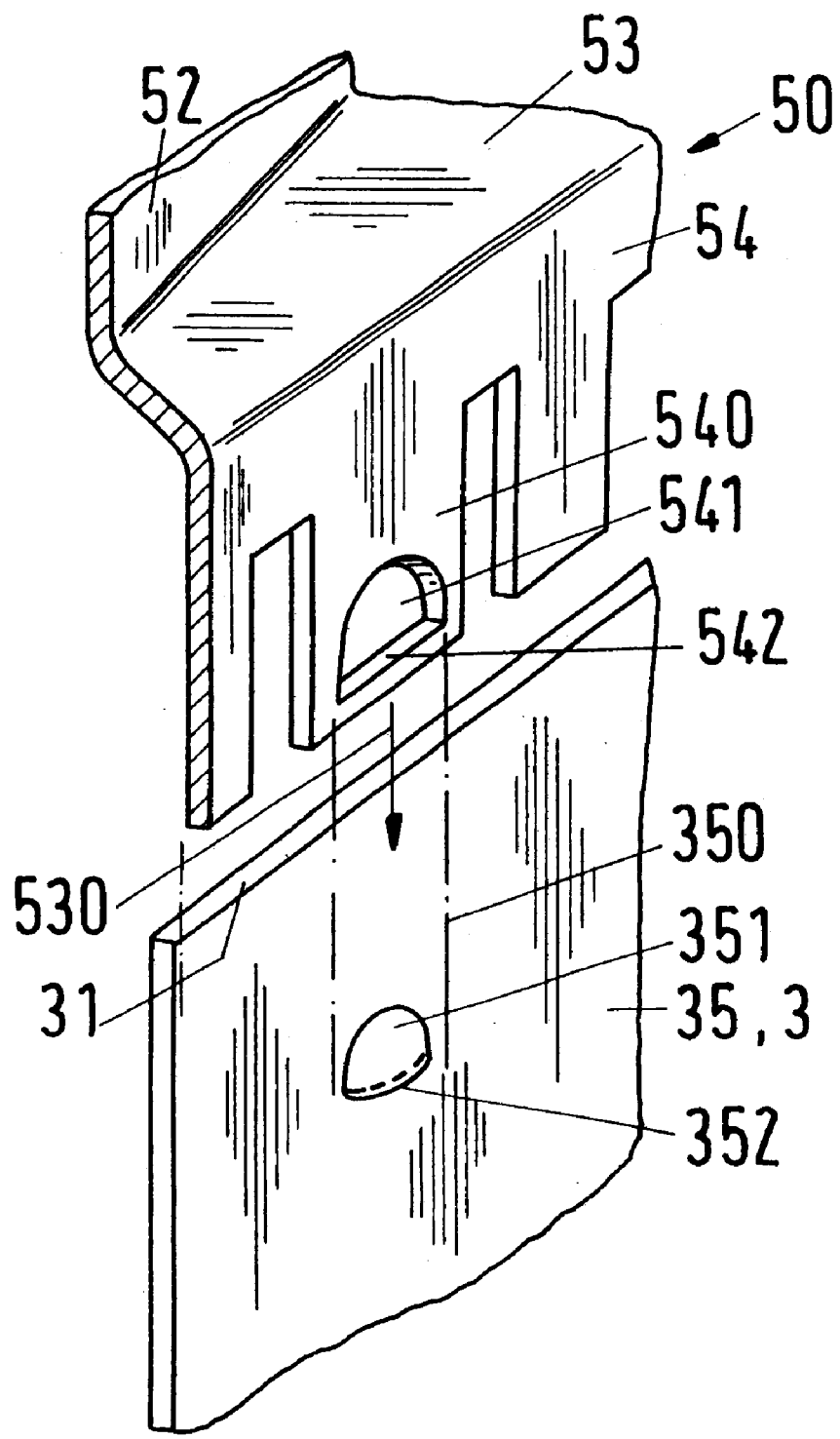
FIG. 7 is a detail of a snap connection between a guide element and a secondary passage.

The guide elements 50 set onto the secondary passages 3 are preferably fixed to the side walls 35 of the secondary passage 3 in each case by means of a releasable snap or plug connection. The one half of such a snap connection is shown in FIG. 7. A tongue 540, which can be deflected out of the plane of the flank 54 in a resiliently elastic manner, is provided in the lower flank 54 of the guide element 50 illustrated in FIG. 4. An aperture 541 included in this tongue 540 has a straight lower edge 542. When the guide element 50 is pushed onto the secondary passage 3 (arrow 530), the tongue 540 slides on the side wall 35 of the secondary passage 3, with the two end points of the edge 542 moving on the lines 350 shown in chain-dotted manner. An elevation 351 of the side wall 35 produced by embossing, which has an edge 352 projecting into the inner space of the secondary passage 3, latches into the aperture 541 of the tongue 540. The two edges 542 and 352 are formed and arranged such that they come to lie flush next to one another in the lowest possible position of the tongue 540 and thus make a snap connection. A corresponding snap connection is also provided for the parallel side wall of the secondary passage 5 not shown in FIG. 7. After a latching of the elevation 351 in the aperture 541, the elastic tongue 540 can be raised somewhat in order to thus release the snap connection.

The position of the guide element is also exactly pre-set by the latch connection, that is by the position of the elevation 351. When the distributor 1 is installed, there thus results—without any effort being required to carry out measurements—a centering of the secondary passages. Moreover, a stable position of the main passage 2 results with respect to the secondary passages 3 by the guide elements 50 fixedly pushed on the secondary passages 3.

What is claimed is:

1. A liquid distributor for columns having a main passage, a plurality of secondary passages and an outflow system of the main passage with which the liquid to be distributed can be fed into the secondary passages in accordance with a pre-set ratio, wherein the outflow system comprises apertures in the side walls of the main passage and—associated with the secondary passages—guide elements for the liquid exiting through the apertures, with the guide elements being designed with respect to a liquid guidance such that the liquid can be led into the associated secondary passage.

2. A liquid distributor in accordance with claim 1, wherein each guide element has a cross-section which brings about the liquid guidance and which narrows in the direction of flow; and wherein the liquid guidance substantially only influences the horizontal speed component and leaves the speed component in the direction of the secondary passage largely unaffected.

3. A liquid distributor in accordance with claim 1, wherein the guide elements are set onto their associated secondary passages and are fixed at the side walls of the secondary passage by means of a releasable snap connection.

4. A liquid distributor in accordance with claim 1, wherein two guide elements are associated with each secondary passage in a symmetrical manner; or wherein only one guide element each is associated with the secondary passages in an offset arrangement of the guide elements.

5. A liquid distributor in accordance with claim 1, wherein the guide elements are formed with mirror symmetry and/or in an asymmetrical manner with respect to a vertical plane directed in the longitudinal extent of the secondary passages.

6. A liquid distributor in accordance with claim 1, wherein the guide elements are each manufactured by forming from a suitably shaped piece of sheet metal.

7. A liquid distributor in accordance with claim 6, wherein the guide elements are closed to the top.

8. A liquid distributor in accordance with claim 6, wherein the guide elements are open to the top.

9. A column having a liquid distributor comprising a main passage, a plurality of secondary passages and an outflow system of the main passage with which the liquid to be distributed can be fed into the secondary passages in accordance with a pre-set ratio, wherein the outflow system comprises apertures in the side walls of the main passage and—associated with the secondary passages—guide elements for the liquid exiting through the apertures, with the guide elements being designed with respect to a liquid guidance such that the liquid can be led into the associated secondary passage.

10. A liquid distributor for a column comprising a main passage including upwardly oriented side walls, a secondary passage located beneath the main passage, and an outflow system for guiding a flow of liquid from the main passage to the secondary passage, the outflow system including apertures in at least one of the side walls of the main passage through which a liquid stream exits the main passage, and a guide element positioned to intercept the liquid stream exiting from the apertures and guiding the liquid stream so that it enters the secondary passage with a relatively large horizontal speed component and a relatively small vertical speed component.

11. A liquid distributor in accordance with claim 10 wherein the guide element includes a surface which intercepts the liquid stream exiting from the apertures and which deflects the liquid stream downwardly towards the secondary passage.

12. A liquid distributor in accordance with claim 11 wherein the surface is inclined relative to a horizontal plane by an angle of less than 90°.

\* \* \* \* \*